Sept. 20, 1966  C. B. ROGERS ET AL  3,273,727
LOAD HANDLING APPARATUS

Filed July 8, 1964  5 Sheets—Sheet 2

INVENTORS
CYRIL B. ROGERS
MAC R. DOOLITTLE
BY
ATTORNEY

Sept. 20, 1966     C. B. ROGERS ET AL     3,273,727

LOAD HANDLING APPARATUS

Filed July 8, 1964     5 Sheets-Sheet 3

INVENTORS
CYRIL B. ROGERS
MAC R. DOOLITTLE
BY
ATTORNEY

Sept. 20, 1966  C. B. ROGERS ET AL  3,273,727
LOAD HANDLING APPARATUS
Filed July 8, 1964  5 Sheets-Sheet 4
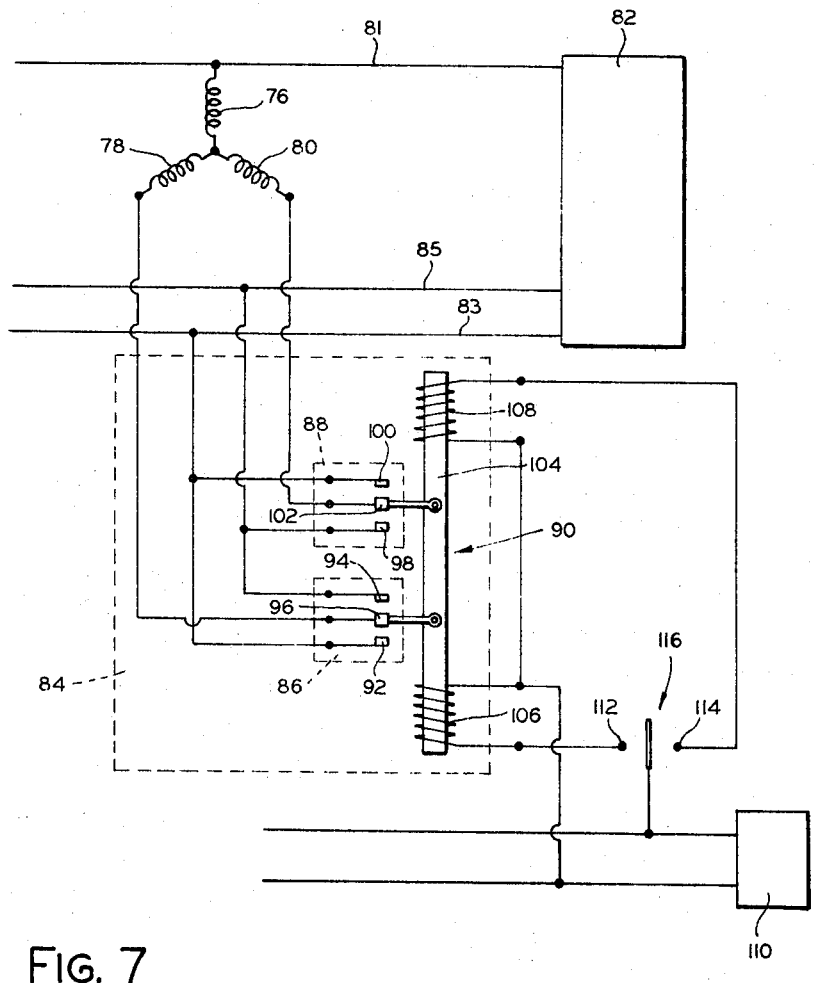
FIG. 8
FIG. 7
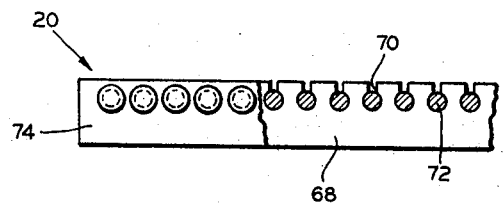
INVENTORS
CYRIL B. ROGERS
MAC R. DOOLITTLE
BY
ATTORNEY Sept. 20, 1966  C. B. ROGERS ET AL  3,273,727
LOAD HANDLING APPARATUS
Filed July 8, 1964  5 Sheets-Sheet 5

INVENTORS
CYRIL B. ROGERS
MAC R. DOOLITTLE
BY
ATTORNEY

United States Patent Office ──

3,273,727
Patented Sept. 20, 1966

3,273,727
LOAD HANDLING APPARATUS
Cyril B. Rogers, Niles, and Mac R. Doolittle, Lansing, Mich., assignors to Clark Equipment Company, a corporation of Michigan
Filed July 8, 1964, Ser. No. 381,025
7 Claims. (Cl. 214—16)

This invention relates to an apparatus for the horizontal handling of a load and which is particularly adaptable for remote control. More specifically, our invention relates to a load handling apparatus especially suitable for a warehousing operation, although it is not limited to such an operation and may be applied, for example, to the movement of people.

It is an object of our invention to provide an improved apparatus for the horizontal handling of loads.

Our invention is well suited for use with a load carrying pallet or the like which utilizes an air film as the medium which provides for support of the pallet during movement thereof instead of wheels, runners, endless tracks or other conventional means for ground apparatus. Therefore, it is a further object of our invention to provide an apparatus which takes advantage of the omnidirectional movement capabilities of an air film load carrying pallet or the like.

From an economic standpoint, it is essential that a warehousing operation utilize the available space to the greatest extent possible for storage, and further that the cost of handling materials in the operation be kept as low as possible. Therefore, it is a further object of our invention to provide apparatus for handling material that requires aisle widths only slightly greater than load or pallet widths.

Another object of our invention is to provide apparatus for handling material that has low propulsion costs.

In carrying out our invention in a preferred embodiment we provide a floor containing air ducts and valves in the floor surface operable to release air from the ducts. Load pallets having a resilient underside are used in conjunction with the floor and cause the air valves to open when they contact them so that an air film is provided between such a pallet and the floor. Propulsion is provided by means of an electric linear motor having a plurality of separate primary windings or members connected to a power source and a pair of secondary windings or members. Preferably, the primary windings are disposed in the floor surface and the secondary windings are disposed in the underside of the pallet, but the location of the windings may be reversed, if desired. The secondary windings of each load pallet are arranged in the form of a cross to facilitate a change of direction of pallet travel, as will be explained more fully hereinafter.

The above and other objects, features and advantages of our invention will become more readily apparent to a person skilled in the art when the following detailed description is taken in conjunction with the drawing wherein:

FIGURE 7 is a side elevation of a portion of one of the secondary windings carried by the load pallet;

FIGURE 8 shows schematically a circuit for energizing a primary winding and controlling the direction of movement of the magnetic field traveling linearly along it.

Figure 1:
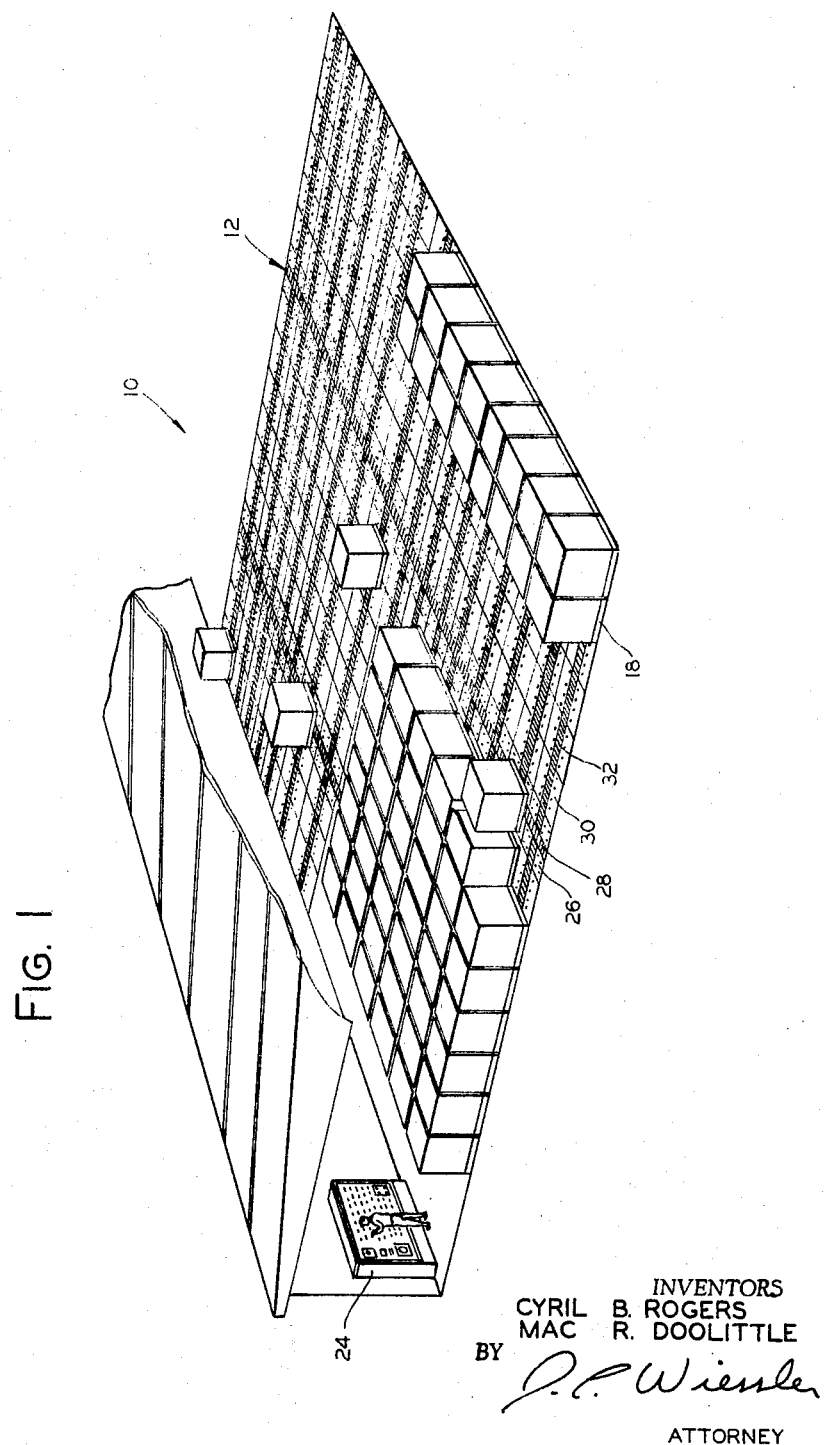
FIGURE 1 is a perspective view of a cut-away portion of a warehouse embodying our invention.

Referring to FIG. 1, the reference numeral 10 denotes a portion of a warehouse embodying our invention. The floor 12 of the warehouse is made up of a large number of air-in-floor units or modules 26 and 30 which abut each other. The air-infloor units are arranged so that primary linear motor windings 28 and 32 located in the surface of these air-in-floor units form a rectangular gridwork. The windings 28 and 32 are separate from each other and are connectible to a power source through a master control, as will be explained in detail hereinbelow. Also, each air-in-floor unit is supplied with pressurized air which may be exhausted through openings in the upper surface thereof.

Figure 6:
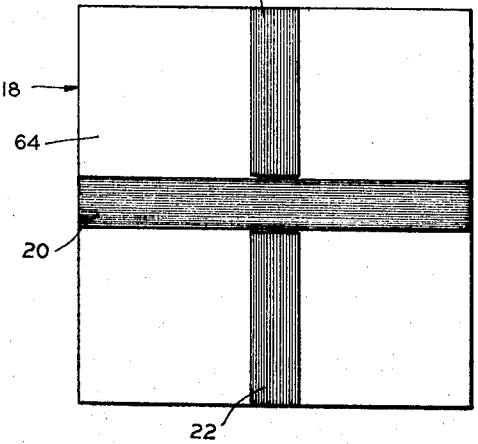
FIGURE 6 is a bottom view of the load pallet shown in FIGS. 4 and 5 and shows to advantage the right angle disposition of the secondary windings in the undersurface thereof.

Load pallets 18 are used in conjunction with floor 12 and include a pair of secondary linear motor windings 20 and 22 in the undersurface thereof (see FIG. 6). The winding 22 is in two portions and disposed at substantially right angles with winding 20 to define therewith a cross.

An operator can control the communication of pressurized air to each air-in-floor module, and also control the energization of the primary linear motor windings through a master control 24 so that a pallet 18 upon which a load is disposed may be moved from a receiving section of the warehouse to a storage section over floor 12 along a predetermined path which involves straight line movement and right angle turns. Also, any pallet 18 may be removed from a storage area and moved across floor 12 to a desired point through the proper manipulation of master control 24 by an operator.

Reference is now had to FIGS. 2, 3, 4 and 5. There are two types of air-in-floor modules, an intersection module 26 having four primary linear motor windings 28 and an air-in-floor module 30 having a single primary linear motor winding 32.

Air-in-floor module 30 is square in order to facilitate alignment of primary linear motor windings 32. Each primary winding 32 is disposed in the upper surface of an air-in-floor module 30, extends from one side to the opposite side and is centered between the other two sides of the module. Also disposed in the upper surface of each air-in-floor module 30 are two rows of air valves 34 which are parallel to primary winding 32.

Air-in-floor module 30 includes a plenum chamber 36 (FIGS. 4 and 5) which is common to all of the air valves 34. Plenum chamber 36 is connected to an air duct segment 38 by means of a conduit 40 within which is disposed an off-on air valve 42 which serves to control communication between air duct segment 38 and plenum chamber 36. Each air duct segment 38 connects with the air duct segment of the adjacent air-in-floor module each end so that pressurized air from an air pressure source 44 (FIG. 9) is communicated to each air-in-floor module by means of an air duct network 46 (FIG. 9) made up of a plurality of air duct segments 38. Thus, by actuating valve 42 to the "on" position, as shown in FIGS. 4 and 5, or to the "off" position communication of pressurized air to plenum chamber 36 may be controlled.

Air valves 34 are disposed in the upper surface of air-in-floor module 30 and function to permit air to escape from plenum chamber 36 at the upper surface of the unit when they are open. Each valve 34 includes a cylindrical member 48 which is disposed in a counterbore 50 that is connected to plenum chamber 36 by a passage 52. Disposed within cylindrical member 48 is a ball 54 which is retained therein by a reduced diameter end portion 56 of cylindrical member 48. The ball 54 is biased into engagement with this reduced diameter end portion 56 by means of a helical spring 58 which is disposed within cylindrical member 48 between ball 54 and the end of counterbore 50. Normally, spring 58 holds ball 54 in sealing relation with reduced diameter end portion 56 so that any pressurized air in plenum chamber 36 cannot escape through valve 34. However, an upsetting force applied to ball 54 against the bias of spring 58 will cause ball 54 to move away from sealing relation with reduced diameter end portion 56 so that valve 34 permits escape of pressurized air from plenum chamber 36.

Figure 2:
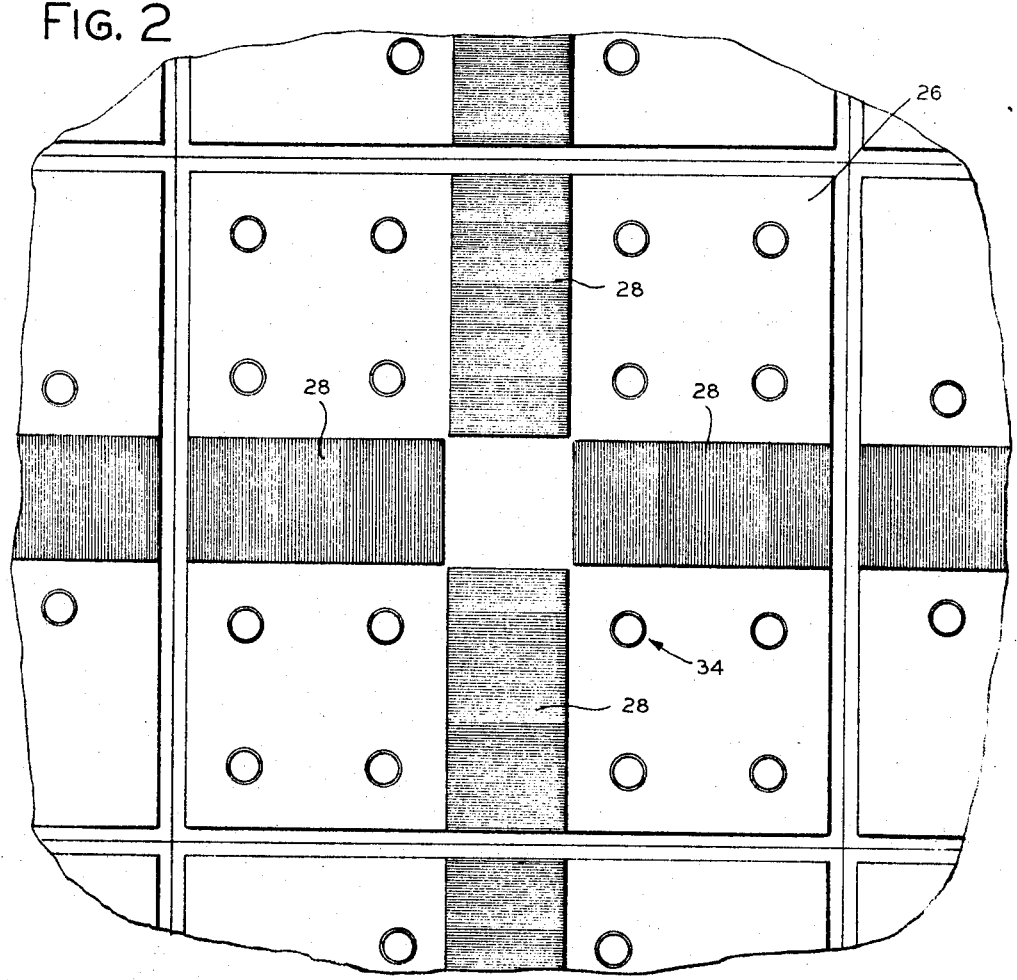
FIGURE 2 is a plan view of an intersection air-in-floor module containing four primary windings which intersect at right angles to each other.
Figure 3:
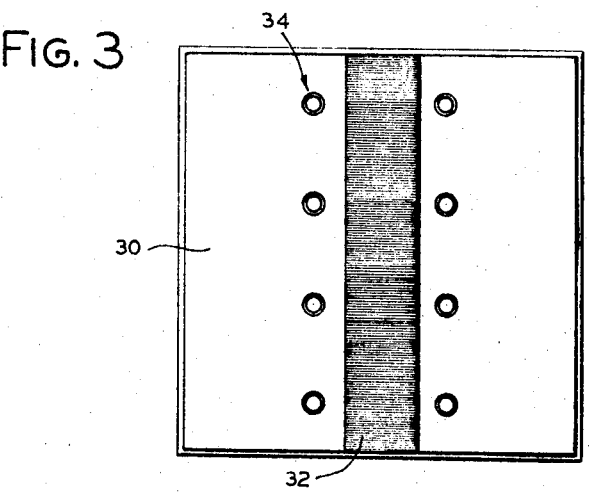
FIGURE 3 is a plan view of an air-in-floor module containing a single primary winding.

Intersection air-in-floor module 26 is identical with air-in-floor module 30 which has been described above in detail, except for the different arrangement of air valves 34, as will be seen from a comparison of FIGS. 2 and 3, and also that module 26 includes four primary linear motor windings 28 disposed at right angles to each other and which extend only partially across the unit. The reason for the use of four primary members 28 will become apparent when the operation of our invention is explained hereinafter.

Figure 4:
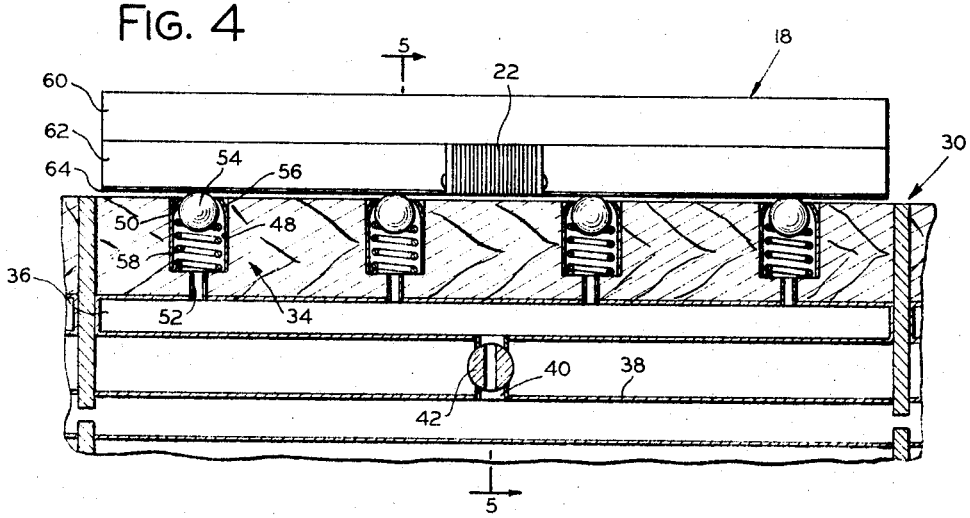
FIGURE 4 is a side elevation of a load pallet supported on an air-in-floor module with a section taken through the air-in-floor module along line 4—4 of FIG. 5 showing to advantage the valves and ducting contained in the module.
Figure 5:
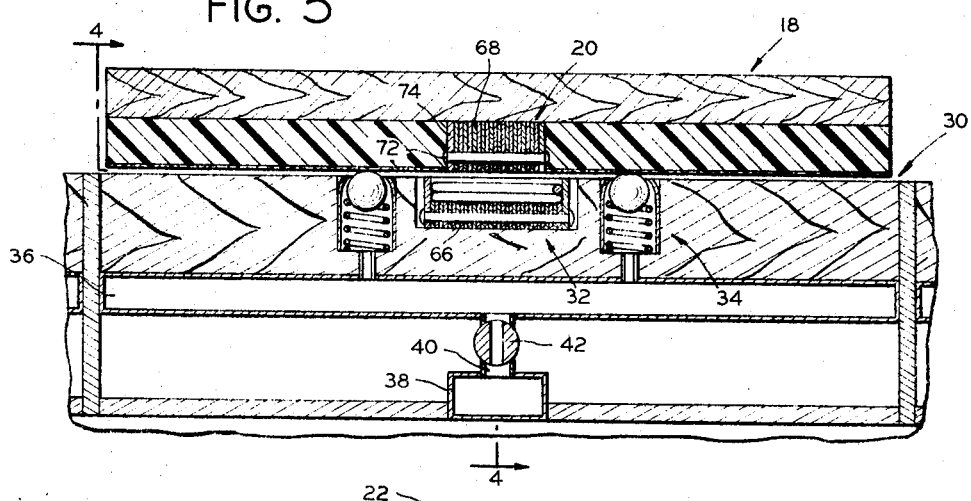
FIGURE 5 is a cross-section taken along line 5—5 of FIG. 4.

Referring now to FIGS. 4, 5 and 6, the load pallet 18 is square (see FIG. 6) and slightly less in side dimension than the air-in-floor modules in order to provide a clearance between load pallets 18 that may be disposed on adjacent air-in-floor modules. Each load pallet 18 includes a relatively rigid top portion 60 which may be heavy-duty plywood. Affixed to rigid portion 60 is a resilient portion 62 which may be sponge rubber or a suitable plastic having similar resilient qualities. The underside of resilient portion 62 is protected by means of a neoprene impregnated fabric, or other similar mate ial 64. Since the underside of each load pallet 18 is resilient it will be able to closely follow minor irregularities in floor 12 for reasons that will become evident during the explanation of the operation of our invention. The load pallet as described thus far is disclosed in detail in U.S. Patent No. Re. 25,045, issued on October 3, 1961. As pointed out hereinabove each load pallet 18 includes a secondary linear motor winding 20 and a secondary linear motor winding 22 which is disposed at right angles to winding 20 on the underside of the pallet.

Each pallet 18 is propelled across floor 12 by means of linear electric motor having a plurality of separate primary windings 28 and 32 disposed in the floor in the form of a rectangular gridwork and secondary windings 20 and 22 carried by each pallet 18, as pointed out hereinabove. It will be understood, of course, that only the secondary winding which is axially aligned with the primary windings at the time functions as part of the linear motor. The linear motor develops its power through the magnetic attraction of a moving polyphase-excited magnetic field traveling linearly along the primary winding and reacting on the axially aligned secondary winding or windings. A more detailed description of a linear electric motor may be found in U.S. Patent No. 2,404,984.

The primary members 28 and 32 each comprise a laminated magnetizable core 66 having slots therein in which is placed a polyphase primary winding, preferably a three-phase winding.

The secondary windings 20 and 22 comprise a laminated magnetizable core 68 having a plurality of slots 70 extending across the laminations (see FIG. 7) and a copper rod 72 disposed in each slot. The copper rods 72 extend outwardly past the core 68 and are connected to copper bars 74 which run along each side of core 68.

Means for controlling energization of a primary linear motor winding and controlling the direction of movement of the magnetic field traveling along it is shown diagrammatically in FIG. 8. The primary windings each include three windings 76, 78 and 80 which have a common connection at one of their ends and are connected at their other ends to a three-phase power supply 82. Winding 76 is connected directly to a line 81 of the power supply 82 and windings 78 and 80 are connected to the other two lines 83 and 85 of the power supply 82 through an on-off reverse relay 84 which is operable to connect or disconnect windings 78 and 80 from lines 83 and 85 in order to control energization of the primary member, and also to reverse the connections of windings 78 and 80 to lines 83 and 85 in order to reverse the direction of the magnetic field traveling along the primary winding. More specifically, relay 84 includes a pair of single pole double throw switches 86 and 88 which are conjointly actuated by a double solenoid 90. Switch 86 includes a pair of fixed single contacts 92 and 94 between which is disposed a movable double contact 96. Contact 96 is connected in circuit to one end of winding 78 and contacts 92 and 94 are connected in circuit to lines 83 and 85, respectively. Switch 88 is identical to switch 86 and includes a pair of fixed contacts 98 and 100 between which is disposed a movable double contact 102. Movable contact 102 is connected to one end of winding 80 and contacts 98 and 100 are connected in parallel circuit with contacts 94 and 92, respectively. The movable contacts 96 and 102 are connected to a plunger member 104 of double solenoid 90. The double solenoid 90 includes a pair of coils 106 and 108 which are disposed at opposite ends of plunger 104 and through which plunger 104 passes. Coils 106 and 108 are connected in parallel circuit to one side of a direct current power supply 110 and connected at the other end to a pair of terminals 112 and 114 of a single pole double throw switch 116 which is operable to open the circuits through coils 106 and 108, close the circuit through coil 106 with the circuit through coil 108 remaining open or close the circuit through coil 108 with the circuit through coil 106 remaining open. Closing the circuit through coil 106 energizes solenoid 90 to cause plunger 104 to move downwardly so that contacts 92 and 96 and of switch 86 and contacts 98 and 102 of switch 88 close with the result that winding 78 is connected in circuit with line 83 of the power supply 82 and winding 80 is connected in circuit with line 85 of the power supply 82. Conversely, manipulation of switch 116 to contact terminal 114 closes the circuit to coil 108 which energizes solenoid 90 to cause plunger 104 to move upwardly. Upward movement of plunger 104 closes contacts 94 and 96 of switch 86 and contacts 100 and 102 of switch 88 with the result that winding 78 is connected in circuit with line 83 of the power supply 82. The switch 116 is conveniently located at master control 24.

Figure 9:
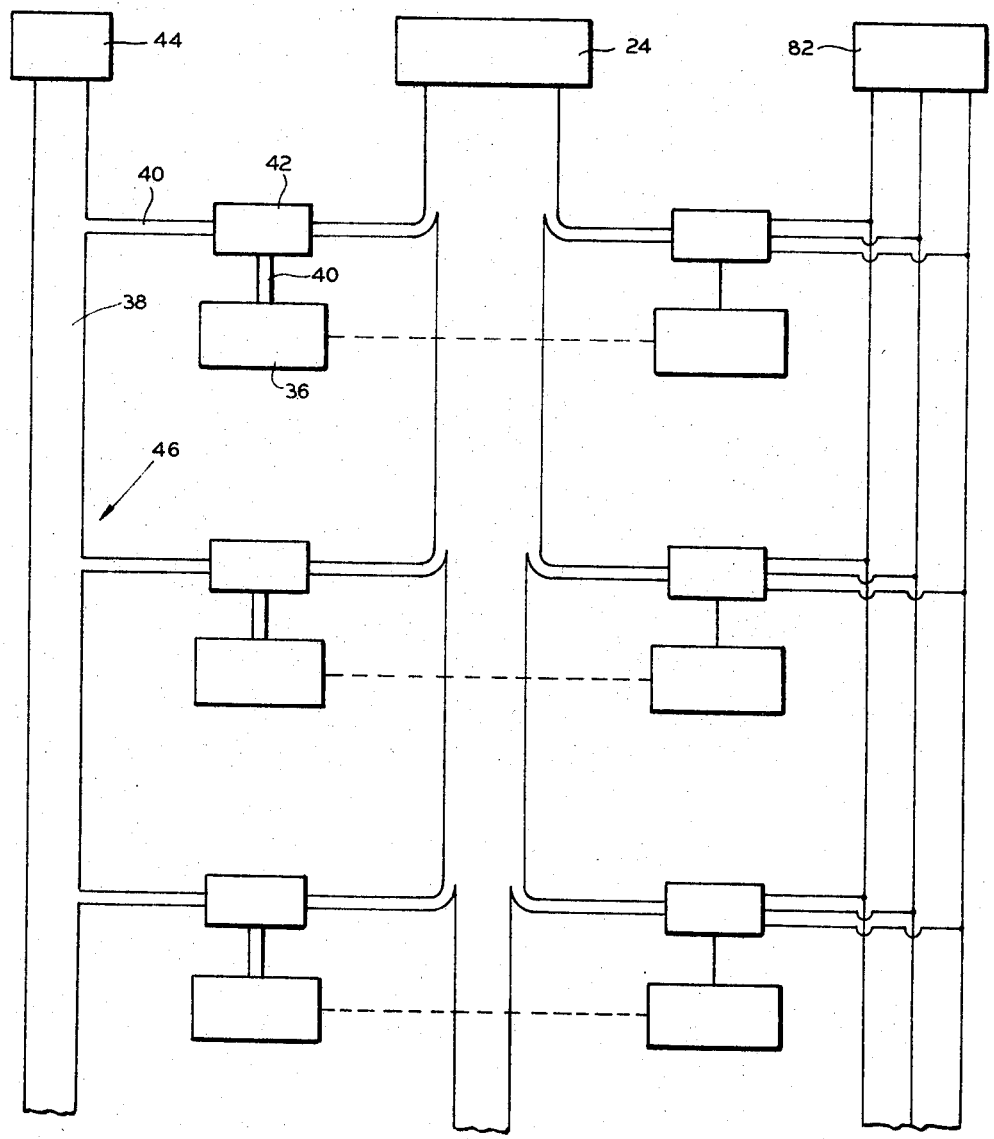
FIGURE 9 shows diagrammatically the control system of our invention.

The control means shown in FIG. 8 for energizing and controlling the direction of movement of the magnetic field along the primary winding is duplicated for each primary winding in the air-in-floor module which make up floor 12. All of the air-in-floor modules are tied together in a control system, as shown in FIG. 9, which is controlled from a master control 24. Each air-in-floor module may be controlled individually from master control 24 by manipulating a switch to energize the primary winding and determine the direction of travel of the magnetic field thereacross and at the same time open valve 42 so that pressurized air from the network 46 is communicated to the plenum chamber 36. While the control system is shown for only three air-in-floor modules, it will be understood that the system extends in a like manner to tie in all of the air-in-floor modules to the master control 24.

We will now describe the operation of our invention. Assuming that a load is brought to the receiving dock of the warehouse for the purpose of storage, it is placed upon a pallet 18 which is disposed on one of the air-infloor modules which make up floor 12. An operator then locates a section of floor 12 upon which to store the pallet and which corresponds to a single air-in-floor module 30. The operator then programs a route over which the pallet moves to the designated space by manipulating a number of switches located at master control 24. When the switch associated with the air-in floor module 30 upon pallet 18 is resting is thrown valve 42 will be actuated to admit pressurized air into plenum chamber 36. Because pallet 18 is resting on the balls 54 of valves 34 and forcing them downward, air will escape through valves 34 and will form an air film between pallet 18 and air-in-floor module 30 over which it is disposed. Because of the air film between pallet 18 and air-in-floor module 30 there is very little resistance to sliding movement of the pallet over the floor. At the same time that valve 42 is actuated to admit pressurized air into plenum chamber 36 the primary winding 32 of the linear motor (FIG. 5) is also energized. Consequently, the pallet 18 will move in the direction of movement of the magnetic field along primary winding 32. Because of the attraction between the secondary winding carried by the pallet 18, and the primary winding in the air-in-floor modules, the pallet 18 will not only be propelled along the floor, but also will be restricted from drifting sidewise or skewing in relation to the primary windings in the air-in-floor modules. So long as successive axially aligned primary windings in succeeding air-in-floor modules 30 are energized with the magnetic field moving the same direction the pallet 18 will continue to move in a straight line across floor 12.

Assuming now that pallet 18 is moving along a straight line path across successive air-in-floor modules 30 and it is now desired to change the direction of the pallet 18 to move at right angles to the present direction of travel, the primary winding 28 of an intersection air-in-floor module 26 which is adjacent the end of a primary winding 32 which comprises part of the path along which pallet 18 is moving is energized so that the magnetic field is moving in the same direction of travel as the pallet. The axially aligned primary winding 28 on the side of intersection air-in-floor module 26 opposite from which pallet 18 is approaching is energized so that the magnetic field is moving in the direction opposite to the travel of pallet 18. Consequently, after pallet 18 moves onto intersection unit 26 sufficiently far enough so that the secondary winding carried by the pallet begins to pass over the primary winding 28 in which the magnetic field is moving in the direction opposite to the direction of travel of the pallet, the pallet will begin to decelerate and finally stop. It will then begin to move back in the direction from which it came until it again begins to pass over the primary winding of intersection module 26 in which the magnetic field is moving in the same direction of travel as the original direction of travel of the pallet. The pallet will again decelerate and finally stop, then reversing its direction to move back again in its original direction. These oscillations of pallet 18 over intersection module 26 finally diminish so that pallet 18 is centered over intersection module 26. At this time both primary windings 28 in the intersection module 26 which were in alignment with the original direction of travel of the pallet are de-energized and the primary windings which lie at right angles thereto are energized so that the magnetic field moves across them in the new direction of travel in which it is desired to move pallet 18. At this point it will be seen that the secondary winding of pallet 18 which cooperates with the primary windings 28 to function as a linear motor lies at right angles to the one which was initially being utilized as part of the linear motor. The above straight line movements and right angle turns are repeated in a similar manner until the pallet 18 is finally positioned over the air-in-floor module 30 which is designated as its storage space. A switch at master control 24 is then manipulated to de-energize the primary winding of the specific air-in-floor module 30 as well as to cut off the supply of air to the plenum chamber thereof. In order to retrieve the load stored in the warehouse on the pallet the procedure for storing the pallet simply is reversed.

While we have described a preferred embodiment of our invention it will be readily understood that our invention is susceptable to various modifications and changes. For example, the primary winding of the linear motor could be placed in the pallet and the secondary winding could be placed in the air-in-floor modules. Consequently, it will be clearly understood that the above-detailed description is for purposes of illustration only and that the scope of our invention should be determined from the following appended claims when taken in view of the prior art.

We claim:

1. A load handling apparatus comprising a floor, a pallet for use in conjunction with said floor, means for providing a fluid film between said pallet and said floor, and means for propelling said pallet over said floor, said propelling means including an electric linear motor having primary windings and secondary windings, one of said windings being located in said floor in a particular pattern, the other of said windings being located on the underside of said pallet and including portions at right angles to each other.

2. The combination of an air floor, a pallet for use with said air floor, means for providing an air film between said pallet and said air floor, and an electric linear motor for propelling said pallet across said air floor, said motor including a plurality of primary windings disposed in said air floor to form a rectangular gridwork and two secondary windings disposed in said pallet at right angles to each other.

3. A load handling apparatus comprising a pallet for transporting and storing loads, a plurality of air floor units each having a single primary linear motor member, a plurality of air floor units each having four separate primary linear motor members disposed substantially 90° apart, said units being arranged in abutting relation to form an air floor with a rectangular gridwork of primary linear motor members, means for selectively energizing said primary linear motor member, means for providing an air film between said pallet and said air floor, and a pair of secondary linear motor members secured to said pallet at right angles to each other said linear motor members cooperating to propel said pallet across said floor.

4. A load handling apparatus comprising a pallet for transporting and storing materials, said pallet including a pair of first linear motor members secured thereto at right angles to each other, and a floor for supporting said pallet, said floor including a gridwork of second linear motor members, said first and second linear motor members cooperating to form propulsion means for said pallet.

5. A load handling apparatus comprising a pallet for carrying a load, a plurality of air floor modules, said plurality of air floor modules being disposed in abutting relation to form an air floor, each module including a plenum chamber, a control valve for connecting said plenum chamber to a source of pressurized air and a plurality of air valves connecting said plenum chamber with the upper surface of said unit, contact by said pallet with said air valves causing them to open so that pressurized air may escape from said plenum chamber to form an air film between said pallet and said air floor module, an electric linear motor for propelling said pallet across said air floor, said motor including a plurality of primary windings disposed in said floor to form a rectangular gridwork and a pair of secondary windings in said pallet, said secondary windings intersecting each other at right angles, and means for conjointly controlling the actuation of the control valve and primary winding of each air floor module independently of all other air floor modules.

6. A load handling apparatus comprising a pallet having a pair of secondary linear motor members secured thereto at right angles to each other, a source of pressurized air, a plurality of air floor modules each having a single primary linear motor member, a plurality of air floor modules each having four primary linear motor members disposed substantially 90° apart, said modules being arranged in abutting relation to form an air floor with a rectangular gridwork of primary linear motor members, each module having a plenum chamber to receive pressurized air from said source, valve means for controlling communications of pressurized air to said plenum chamber and a plurality of air valves operable to connect said plenum chamber with the upper surface of the respective modules, contact by said pallet with said air valves causing them to open so that pressurized air may escape from the respective plenum chamber to form an air film between said pallet and said air floor, and master control means operable to conjointly energize a primary member and open the control valve means in the same unit, said primary members being individually energizable through said master control means.

7. A load handling apparatus for use with a pallet having a pair of linear motor windings secured thereto at right angles to each other, said apparatus comprising a plurality of air floor modules each having a single linear motor winding, a plurality of air floor modules each having four separate linear motor windings disposed substantially 90° apart, said modules being arranged in abutting relation to form an air floor with a rectangular gridwork made up of said second and third-mentioned linear motor windings, and means for providing an air film between the pallet and said air floor.

References Cited by the Examiner

UNITED STATES PATENTS

| | | | |
|---|---|---|---|
| Re. 25,045 | 10/1961 | Petersen et al. | 214—1 |
| 859,019 | 7/1907 | Smith | 310—13 |
| 2,144,835 | 1/1939 | Dickenson | 198—41 X |
| 2,404,984 | 7/1946 | Powers | 104—151 |
| 2,637,140 | 5/1953 | Hoff | 180—2 X |
| 2,924,343 | 2/1960 | Isven | 214—16 |
| 3,081,886 | 3/1963 | Flexman et al. | |
| 3,108,698 | 10/1963 | Petersen | 214—1 |

GERALD M. FORLENZA, *Primary Examiner*.

ROBERT G. SHERIDAN, *Examiner*.